US010784591B2

(12) United States Patent
Cardona, Jr. et al.

(10) Patent No.: US 10,784,591 B2
(45) Date of Patent: Sep. 22, 2020

(54) 3D 360 DEGREE OMNIDIRECTIONAL MIMO

(71) Applicant: ELECTRONIC DESIGN & DEVELOPMENT, CORP., Tucson, AZ (US)

(72) Inventors: Sergio E. Cardona, Jr., Tucson, AZ (US); Kevin W. Patrick, Tucson, AZ (US); Joel Blumke, Tucson, AZ (US); Silvio Cardero, Tucson, AZ (US); Kevin G Ehrichs, Tucson, AZ (US); Samuel F Frey, Tucson, AZ (US); Thomas G Subiti, Tucson, AZ (US); Marwan M Krunz, Tucson, AZ (US); Milton E Cardona, Tucson, AZ (US)

(73) Assignee: ELECTRONIC DESIGN & DEVELOPMENT, CORP., Tucson, AZ (US)

( * ) Notice: Subject to any disclaimer, the term of this patent is extended or adjusted under 35 U.S.C. 154(b) by 0 days.

(21) Appl. No.: 16/830,065

(22) Filed: Mar. 25, 2020

(65) Prior Publication Data

US 2020/0235494 A1    Jul. 23, 2020

Related U.S. Application Data

(63) Continuation-in-part of application No. 16/750,337, filed on Jan. 23, 2020.

(60) Provisional application No. 62/979,765, filed on Feb. 21, 2020, provisional application No. 62/795,934, filed on Jan. 23, 2019.

(51) Int. Cl.
| | | |
|---|---|---|
| H01Q 21/26 | (2006.01) | |
| H01Q 21/20 | (2006.01) | |
| H04B 7/0413 | (2017.01) | |
| H01Q 3/24 | (2006.01) | |
| H01Q 9/28 | (2006.01) | |

(52) U.S. Cl.
CPC ............ *H01Q 21/26* (2013.01); *H01Q 3/242* (2013.01); *H01Q 9/285* (2013.01); *H01Q 21/205* (2013.01); *H04B 7/0413* (2013.01); *H01Q 3/247* (2013.01)

(58) Field of Classification Search
CPC .... H04B 7/0413; H01Q 21/205; H01Q 21/26; H01Q 3/242
See application file for complete search history.

(56) References Cited

U.S. PATENT DOCUMENTS

2019/0348759 A1    11/2019   Walker et al.
2019/0379427 A1*  12/2019   Geekie .................... H01Q 3/34

OTHER PUBLICATIONS

H. T. Hui, Numerical and experimental studies of a helical antenna loaded by a dielectric resonator, Radio Science, vol. 32, No. 2, pp. 295-304, Mar.-Apr. 1997.

(Continued)

*Primary Examiner* — Ricardo I Magallanes
(74) *Attorney, Agent, or Firm* — Nguyen Tarbet

(57) ABSTRACT

A three-dimensional, 360 degree, omnidirectional multiple-input multiple-output wireless systems is described herein. The multiple-input multiple-output wireless system is comprised of a plurality of radio inputs, a plurality of radio-frequency converters, an RF signal distribution network, a plurality of transceivers, and a plurality of antennas. The multiple-input multiple-output wireless system may further have a plurality of planar stacks.

15 Claims, 9 Drawing Sheets
(9 of 9 Drawing Sheet(s) Filed in Color)

(56) References Cited

OTHER PUBLICATIONS

Rousstia, M. W. et al., Switched-beam array of dielectric rod antenna with RF-MEMS switch for millimeter-wave applications, Radio Sci., 2015, 50, 177-190.

Black et al., Breaking Down mmWave Barriers with Holographic Beam Forming, MW Journal, Feb. 2020, vol. 63, No. 2.

* cited by examiner

3D 360 DEGREE OMNIDIRECTIONAL MIMO

CROSS-REFERENCES TO RELATED APPLICATIONS

This application is a non-provisional and claims benefit of U.S. Patent Application No. 62/979,765 filed Feb. 21, 2020, the specification of which is incorporated herein in its entirety by reference.

This application is a continuation-in-part and claims benefit of U.S. patent application Ser. No. 16/750,337, filed Jan. 23, 2020, which is a non-provisional and claims benefit of U.S. Patent Application No. 62/795,934, filed Jan. 23, 2019, the specification(s) of which is/are incorporated herein in their entirety by reference.

BACKGROUND OF THE INVENTION

Field of the Invention

The present invention relates to wireless converters, in particular, to multi-input, multi-output re-configurable wireless converters.

Background Art

An antenna is a device for efficiently radiating electromagnetic energy into free space, from a system that otherwise confines its electromagnetic energy. An antenna that radiates electromagnetic energy equally in all spatial directions in three-dimensional space may be deemed an isotropic radiator. By contrast, in certain applications it is advantageous to create an anisotropic radiator, one which largely confines the radiation to within a narrow beam in a specific desired direction. Common methods to direct the radiation pattern of an antenna (radiating structure) from one orientation in three-dimensional space to another may involve either physically reorienting the antenna mechanism, or employing precise phase control among a collection of fixed antenna elements. Both of these methods must overcome the inertia of either the mechanism, or of the phase control actuating element, an inertia which in turn limits the agility with which the beam may be redirected.

BRIEF SUMMARY OF THE INVENTION

It is an objective of the present invention to provide systems, devices and methods that allow for efficient radio coverage of a wide angular region, as specified in the independent claims. Embodiments of the invention are given in the dependent claims. Embodiments of the present invention can be freely combined with each other if they are not mutually exclusive.

Wireless networking infrastructure meeting standards that may be deployed in the near future, such as for 5G networking, may drive demand for far more precise control of the direction, polarization, and level of over-the-air electromagnetic radiation than may have been the case for prior wireless networking standards. This demand may apply equally to radiated electromagnetic power as well as to received electromagnetic power. Accordingly, sophisticated radiating structures may be necessary, structures whose pattern of radiation may be highly configurable in direction, polarization, and power level, structures which may interface with several radios simultaneously in a dynamically assigned manner. Further, the over-the-air operating frequencies for 5G networking may be considerably higher, for instance near 30 gigahertz, than those employed in currently deployed wireless infrastructure, near 3 gigahertz. Hence, a near-term economy of reuse may be derived by the present invention when it presents to the existing wireless infrastructure an interface employing commonly used frequencies near 3 gigahertz, and then translating, or up-converting and down-converting, these spectra in order to interface with over-the-air 5G networking frequencies near 30 gigahertz, as a utility of the sophisticated radiating structure.

Accordingly, the present invention may integrate the features of both a sophisticated radiating structure capable of addressing 360 degrees of azimuth and 60 degrees of elevation, together with a utility for up-conversion and down-conversion that may correspond with multiple external radios simultaneously, all into a single multiple-input, multiple-output wireless system. The present invention quantizes the orientation of a sophisticated radiating structure's beam into a finite set of solid-angular sub-regions that may be rapidly re-selected, such that the inertia to direct the beam from one solid-angular sub-region to another is almost infinitesimal. Moreover, in the present invention, because multiple radios may access a shared sophisticated radiating structure, each solid-angular sub-regional antenna element may deploy its own independent beam that may be distinguished from neighboring beams by any to all of: its carrier frequency; its polarization of radiation; and its power level. Further, the present invention may hide the complexity of a radiating structure operating at a comparatively high frequency of radiation by presenting it as having an interface that may appear as one at a comparatively low frequency of radiation, which is more readily accommodated. Once such a system has been realized, the system may find further application in dual-use technologies suitable for electronic warfare.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which.

Figure 1A:
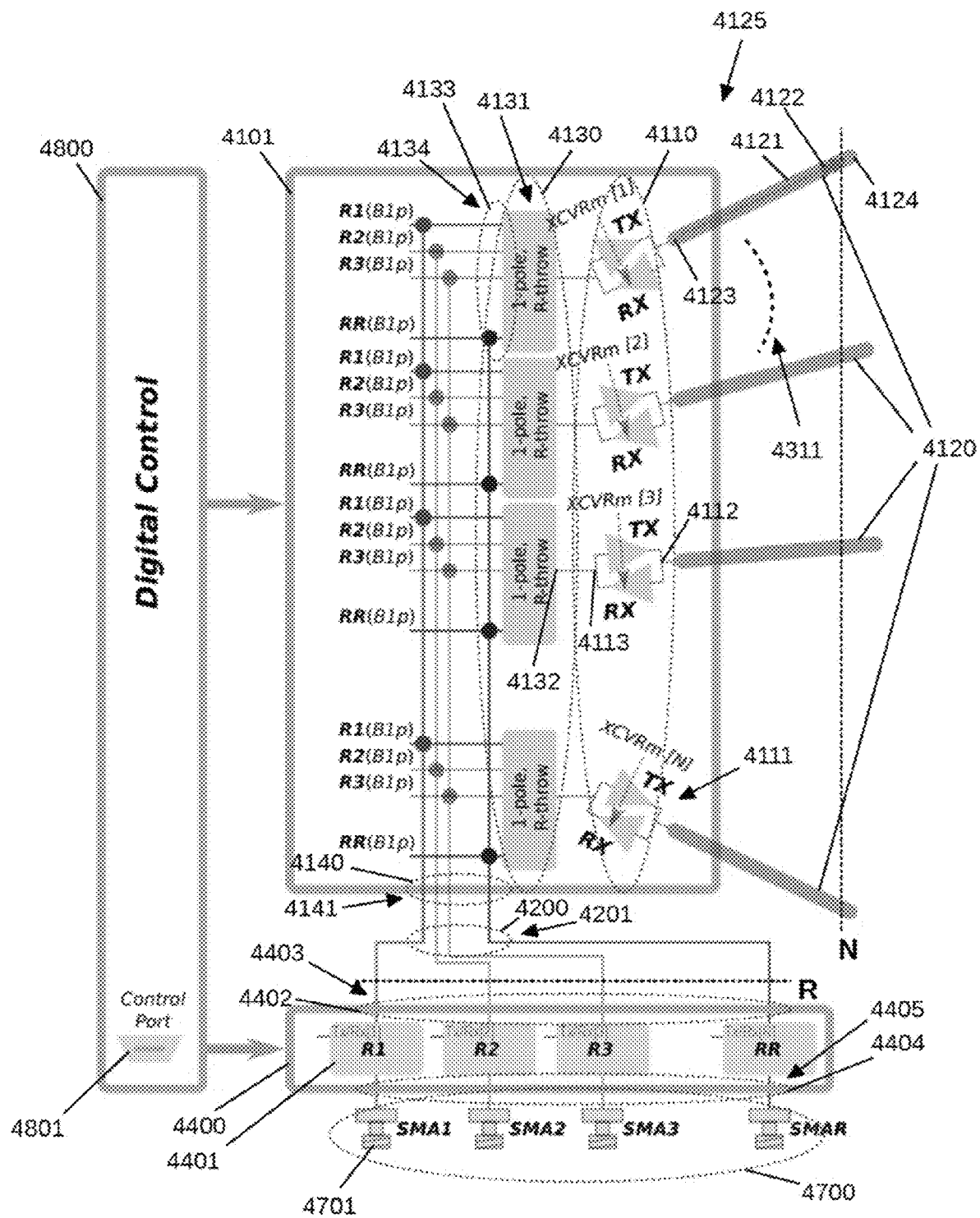
FIG. 1A shows a diagram of a planar stack (4101) of N oriented antennas (4121), a plurality of radios (4400) R in number, and a digital control logic (4800). (N and R are some positive integers.)
Figure 1B:
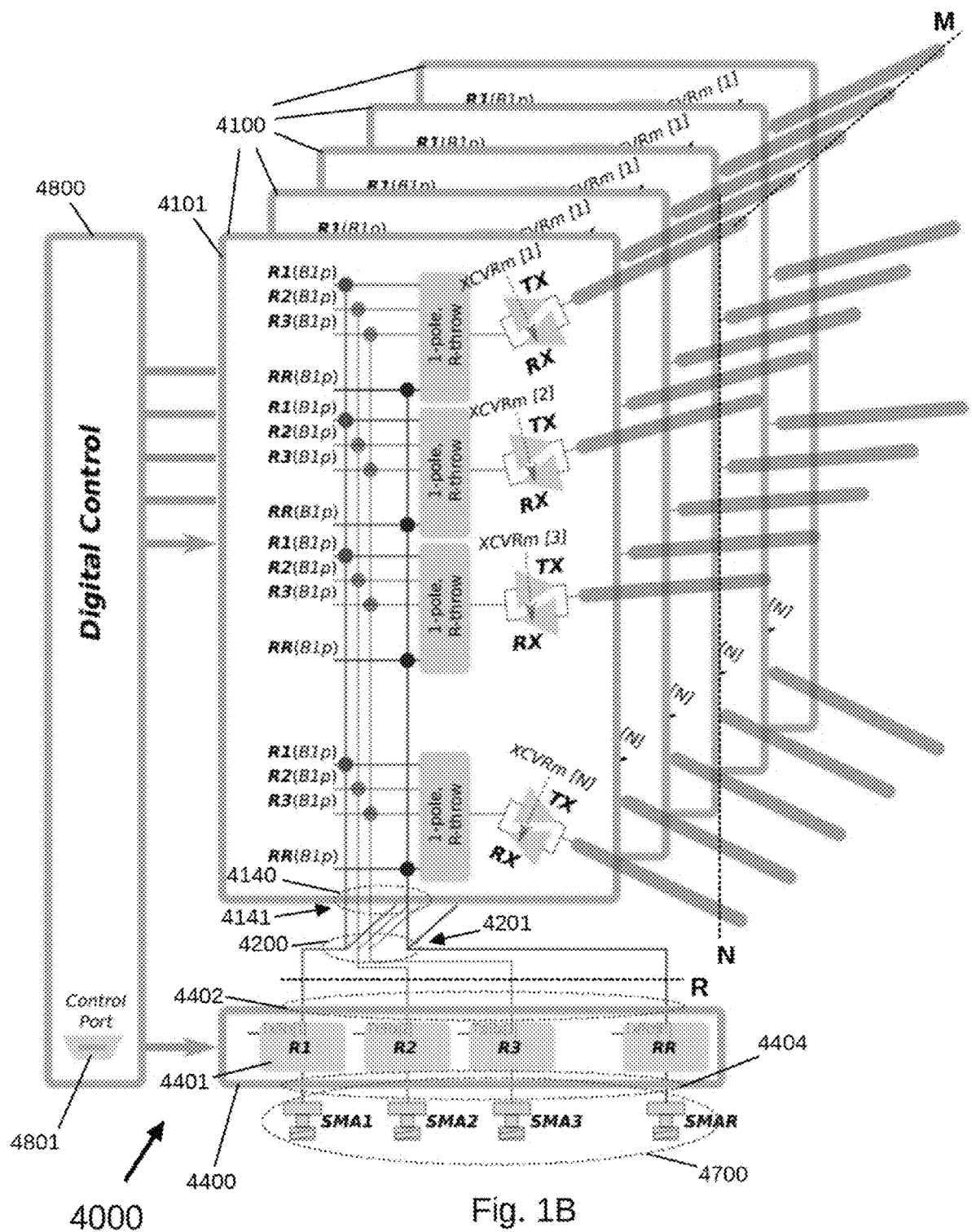
FIG. 1B shows an extension of the multiple-input multiple-output wireless system (MIMO) (4000) diagrammed in FIG. 1A. A plurality of planar stacks (4100) M in number accesses a plurality of radio feeds (4200) from the plurality of radios (4400). (M is some positive integer.) Each planar stack (4101) is individually controllable by the digital control logic (4800).
Figure 1C:
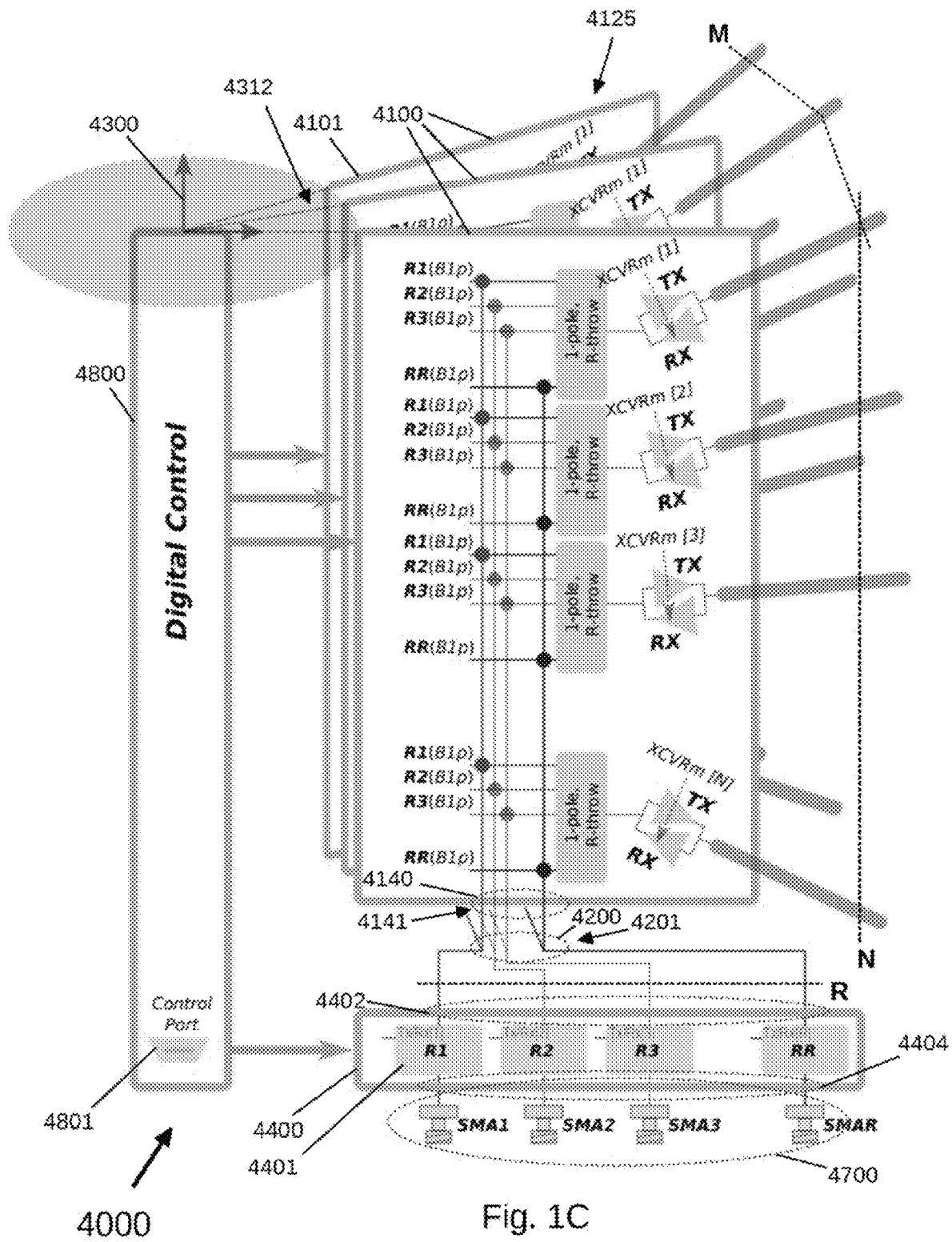

FIG. 1C shows in more detail the physical orientation of the various planar stacks (4101) among the plurality of planar stacks (4100) M in number. Each planar stack (4101), among the plurality of planar stacks (4100) M in number, is offset in its angular orientation from its nearest neighbor by a constant inter-plane angular offset (4312), about an array axis of symmetry (4300), in a fanned arrangement.

Figure 2A:
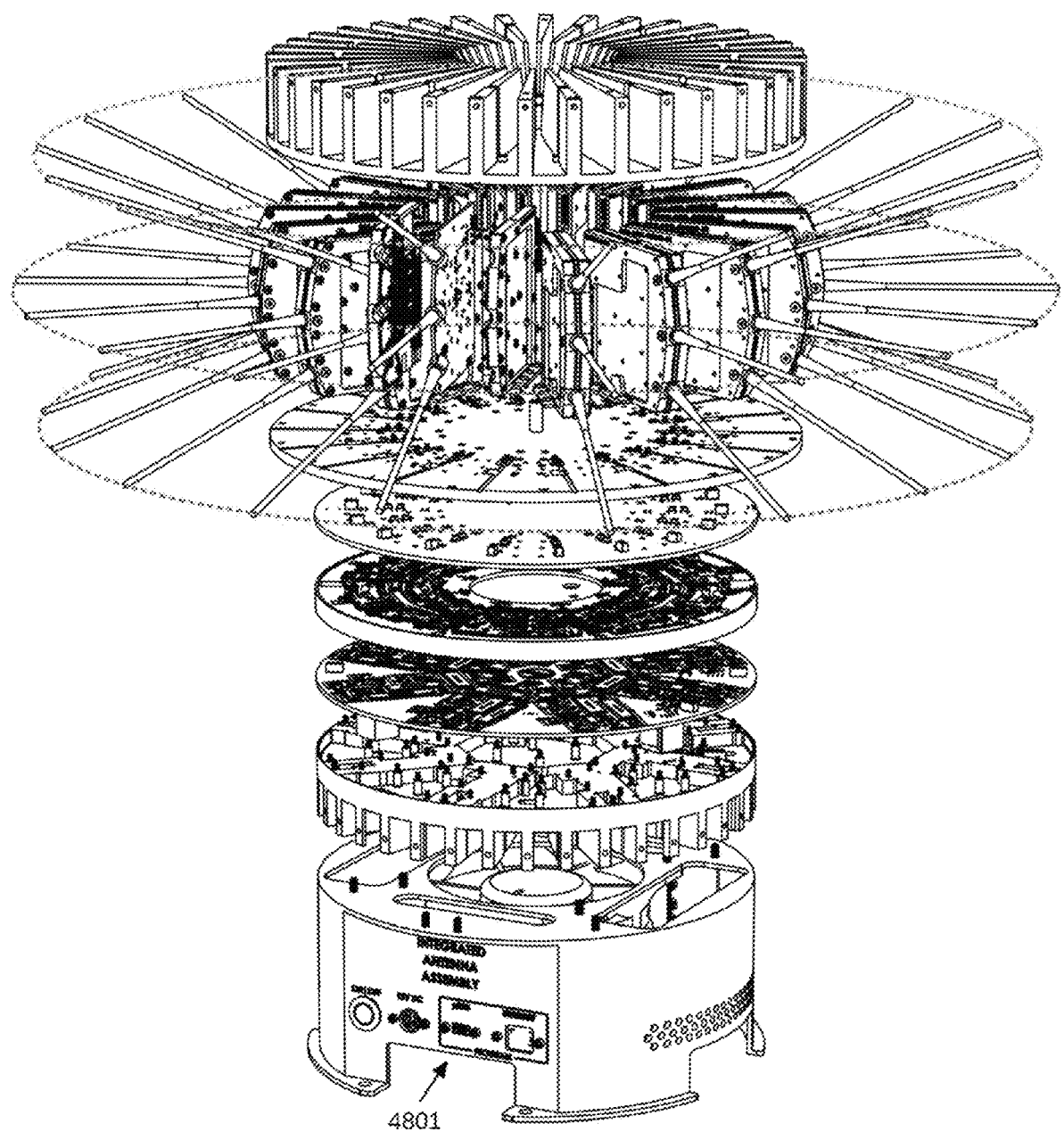

FIG. 2A shows a technical drawing of the mechanical assembly (in exploded view, from the front) of the multiple-input multiple-output wireless system (MIMO) (4000), overlaid with reference circles for each row of oriented antennas (4121) M in number. Here, M=18 and N=3. The control port (4801) for the digital control logic (4800) is visible at the base of the mechanical assembly.

Figure 2B:
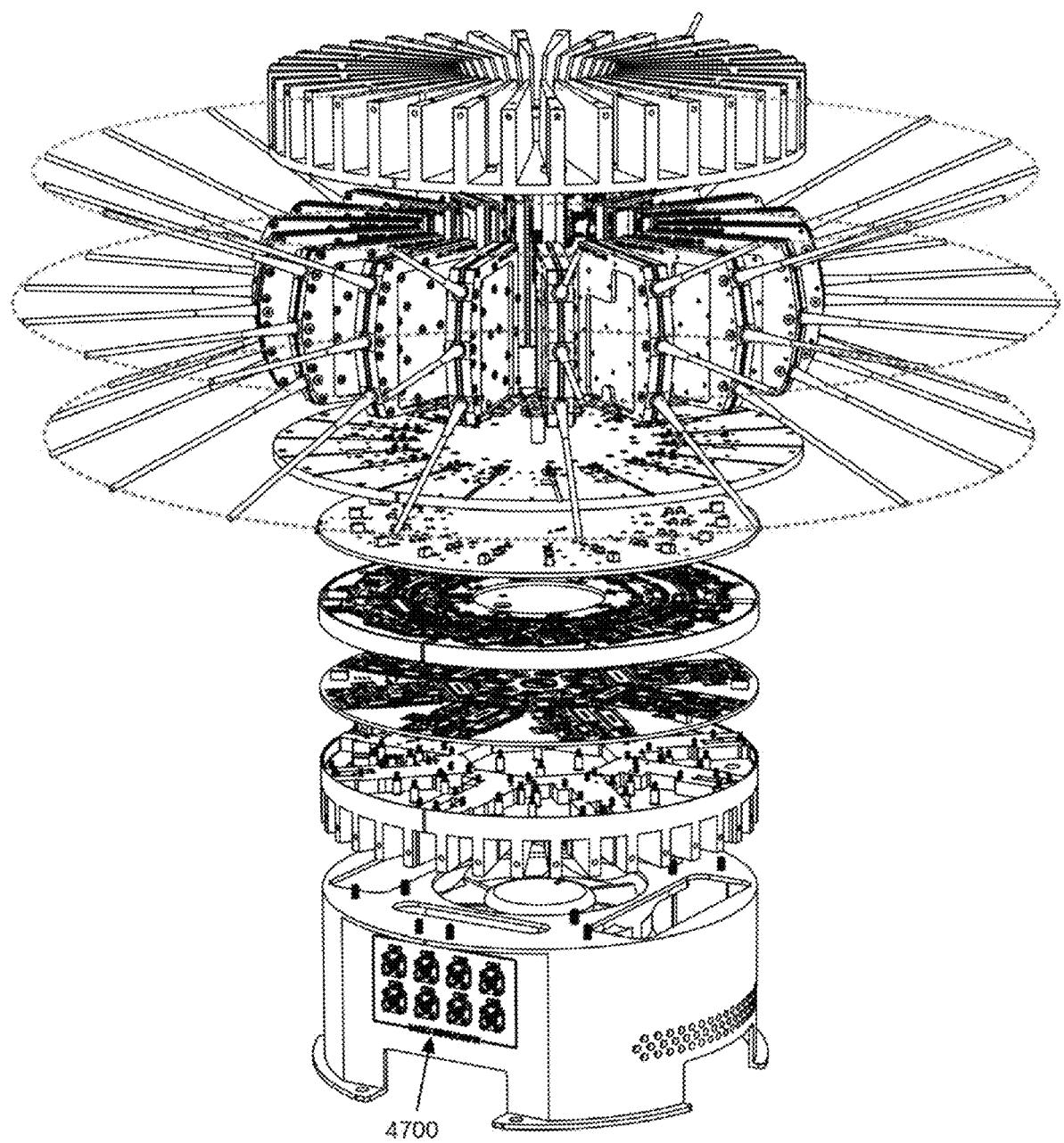

FIG. 2B shows a technical drawing of the mechanical assembly (in exploded view, from the rear) of the multiple-input multiple-output wireless system (MIMO) (4000), overlaid with reference circles for each row of oriented antennas (4121) M in number. The plurality of input-output radio-frequency connectors (4700) is visible at the base of the mechanical assembly.

Figure 3A:
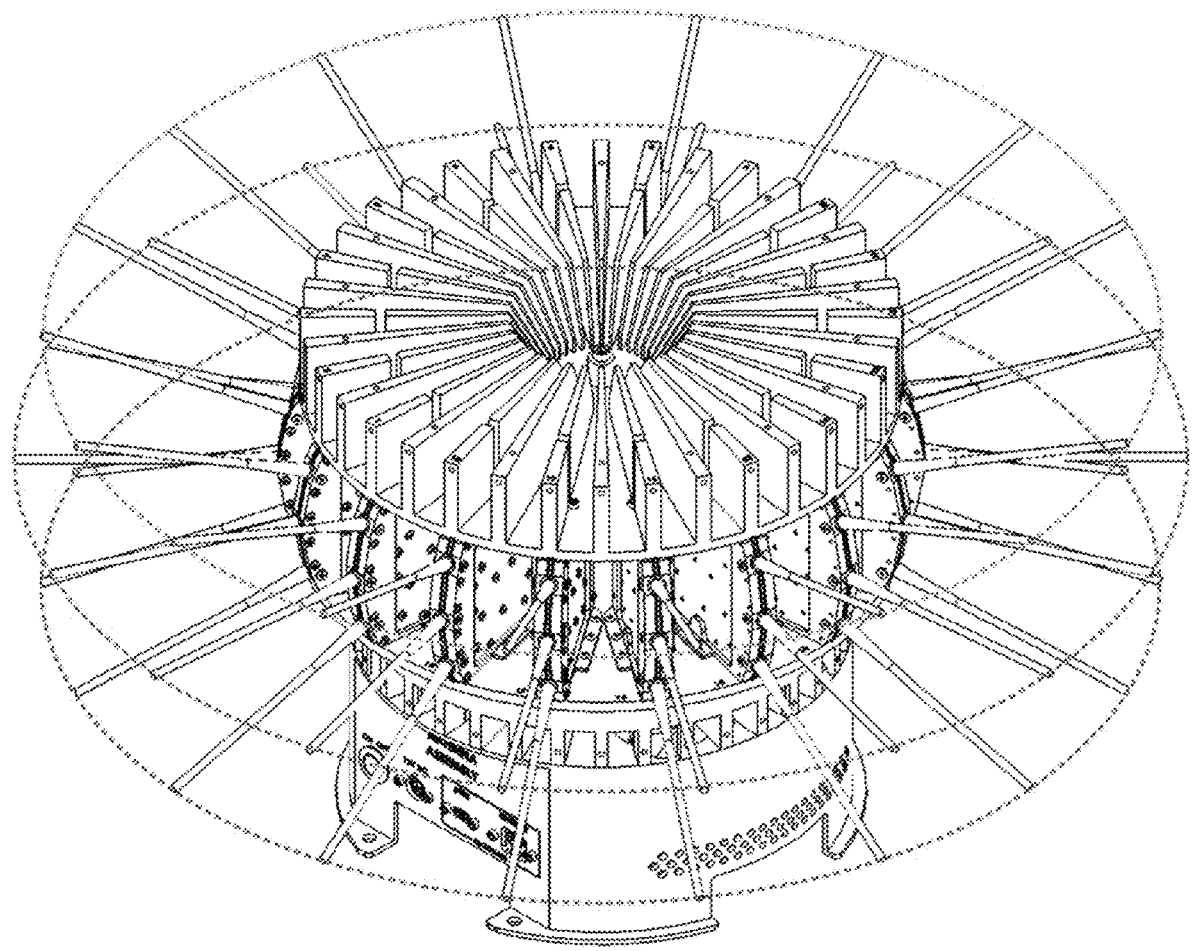

FIG. 3A shows a technical drawing of the mechanical assembly (in orthogonal view, from the front quarter) of the multiple-input multiple-output wireless system (MIMO) (4000), overlaid with reference circles for each row of oriented antennas (4121) M in number.

FIG. 38 shows a technical drawing of the mechanical assembly (in front view) of the multiple-input multiple-output wireless system (MIMO) (4000), overlaid with reference circles for each row of oriented antennas (4121) M in number. The control port (4801) for the digital control logic (4800) is visible at the base of the mechanical assembly.

Figure 4:
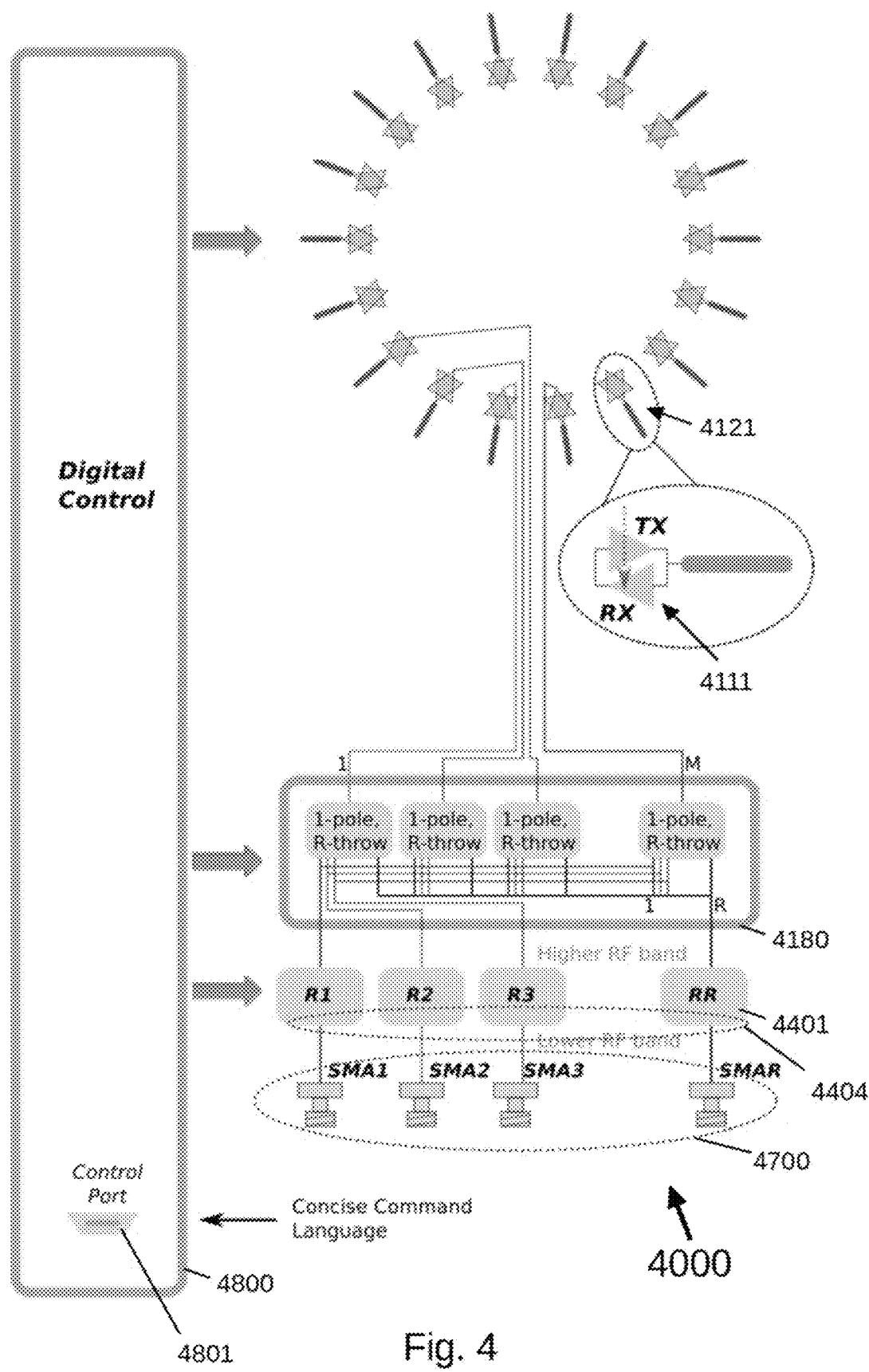

FIG. 4 shows a highly schematic view of the entire multiple-input multiple-output wireless system (MIMO) (4000), including a plurality of oriented antennas (4121) with integrated transceiver blocks (4111), radio-frequency fanning network (4180), plurality of radios (4401) and digital control logic (4800).

Figure 5:
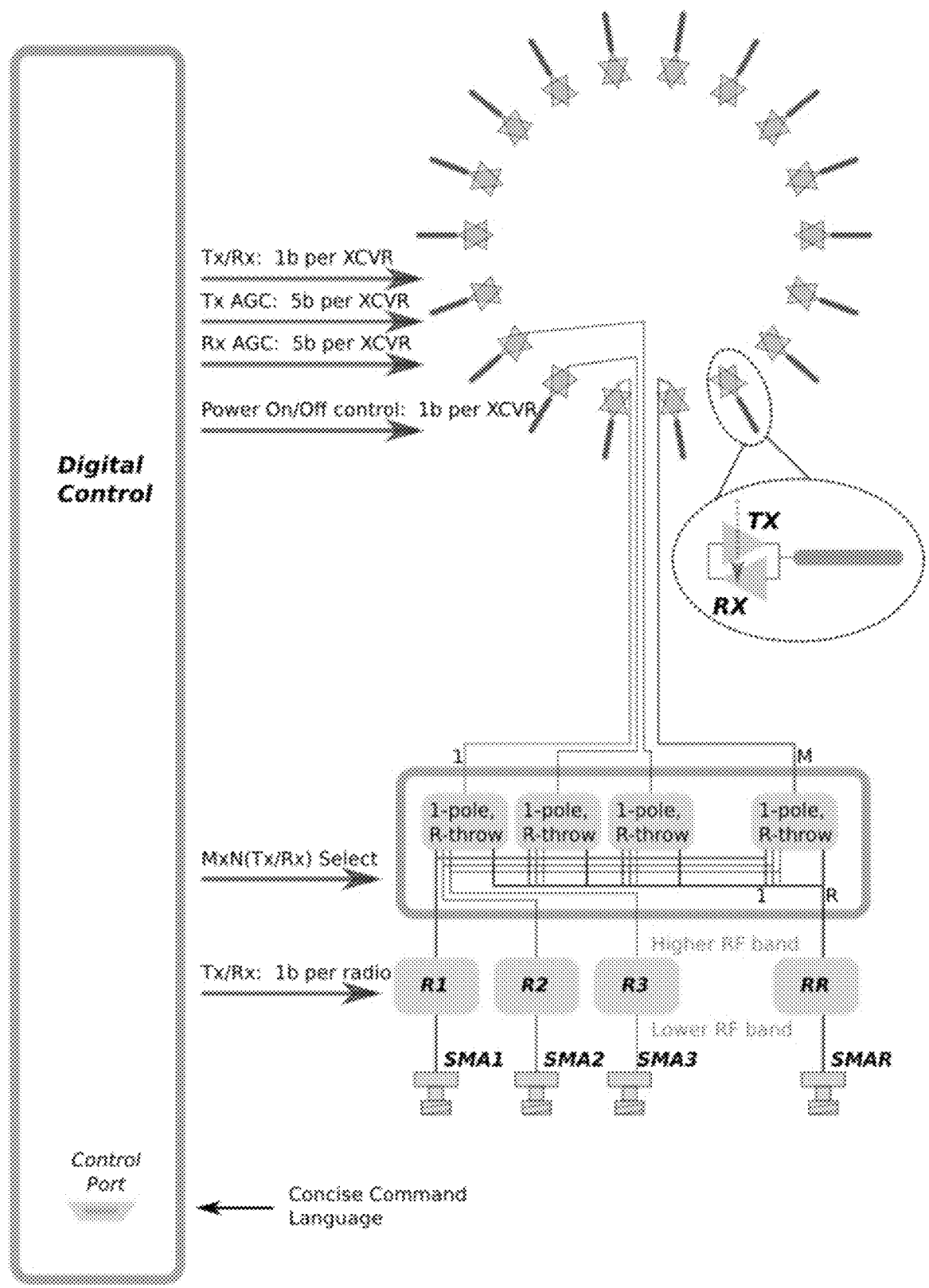

FIG. 5 shows the multiple-input multiple-output wireless system (MIMO) (4000) of FIG. 4, wherein the roster of control signals from the digital control logic (4800) to other components may be more explicitly detailed. Specifically, each transceiver block (4111) may be controlled by: 1 bit for transmit/receive state; 5 bits for transmit automatic gain control (AGC); and 5 bits for receive automatic gain control (AGC). The radio-frequency fanning network (4180) may be controlled by: a plurality of transmit/receive control lines; and a plurality of M×N select lines. Each radio (4401) may be controlled by: 1 bit for transmit/receive state.

DETAILED DESCRIPTION OF THE INVENTION

Following is a list of elements corresponding to a particular element referred to herein:
4000 multiple-input, multiple-output wireless system (MIMO)
4100 plurality of planar stacks
4101 planar stack
4110 plurality of transceiver blocks
4111 transceiver block
4112 transceiver block first port
4113 transceiver block second port
4120 plurality of oriented antennas
4121 oriented antenna
4122 Poynting ray
4123 stem
4124 tip
4125 Poynting plane
4130 plurality of 1-pole R-throw radio selectors
4131 1-pole R-throw radio selector
4132 radio selector common port
4133 radio selector plurality of switch ports
4134 radio selector switch port
4140 plurality of stack radio feed ports
4141 stack radio feed port
4180 radio-frequency fanning network
4200 plurality of radio feeds
4201 radio feed
4300 array axis of symmetry
4311 inter-ray angular offset
4312 inter-plane angular offset
4400 plurality of radios
4401 radio
4402 plurality of radio feed ports
4403 radio feed port
4404 plurality of input-output radio-frequency ports
4405 input-output radio frequency port
4700 plurality of input-output radio-frequency connectors
4701 input-output radio-frequency connector
4800 digital control logic
4801 control port Referring now to FIG. 1C and FIG. 3A, the present invention features a three-dimensional (3D), 360 degree, omnidirectional multiple-input multiple-output wireless system (MIMO) (4000). In FIG. 1C, the view is a schematic one, whereas FIG. 3A shows an orthogonal view of the mechanical implementation of an example embodiment of the present invention.

Referring now of FIG. 1C and FIG. 3A, a three-dimensional (3D), 360 degree, omnidirectional multiple-input multiple-output wireless system (MIMO) (4000) may comprise: a plurality of planar stacks (4100); a plurality of radio feeds (4200); a plurality of radios (4400); and a digital control logic (4800). Together, the plurality of planar stacks (4100), the plurality of radio feeds (4200), the plurality of radios (4400), and the digital control logic (4800) may constitute the top-level structure of the present invention.

Referring now of FIG. 1C and FIG. 3A, the plurality of planar stacks (4100) may comprise M planar stacks (4101), wherein M is some first fixed positive integer. In the example embodiment of FIG. 3A, the number of planar stacks (4100), M, is 18, and the planar stacks (4101) are uniformly arranged about 360 degrees of azimuth. The terms azimuth and elevation, taken together as a pair, may uniquely describe a direction of orientation with respect to a given reference orientation in three-dimensional space. To demonstrate these terms by way of example, if the given reference orientation were a compass face at some given point on the northern hemisphere of Earth, then the north star, Polaris, would be observed by a telescope oriented at an azimuth of true north (0 degrees, within about 2 degrees), and at an elevation of about 90 degrees, minus the north latitude of the given point on the northern hemisphere of Earth. In mathematics, a spherical coordinate system is a coordinate system for three-dimensional space where the position of a point is specified by three numbers: the radial distance of that point from a fixed origin, its polar angle measured from a fixed zenith direction, and the azimuthal angle of its orthogonal projection on a reference plane that passes through the origin and is orthogonal to the zenith, measured from a fixed reference direction on that plane. It can be seen as the three-dimensional version of the polar coordinate system. The elevation angle may be equal to the negative of the polar angle, plus 90 degrees. The reference orientation of the present invention may be determined relative to the array axis of symmetry (4300), and the arbitrary selection of some given planar stack (4101).

Figure 3B:
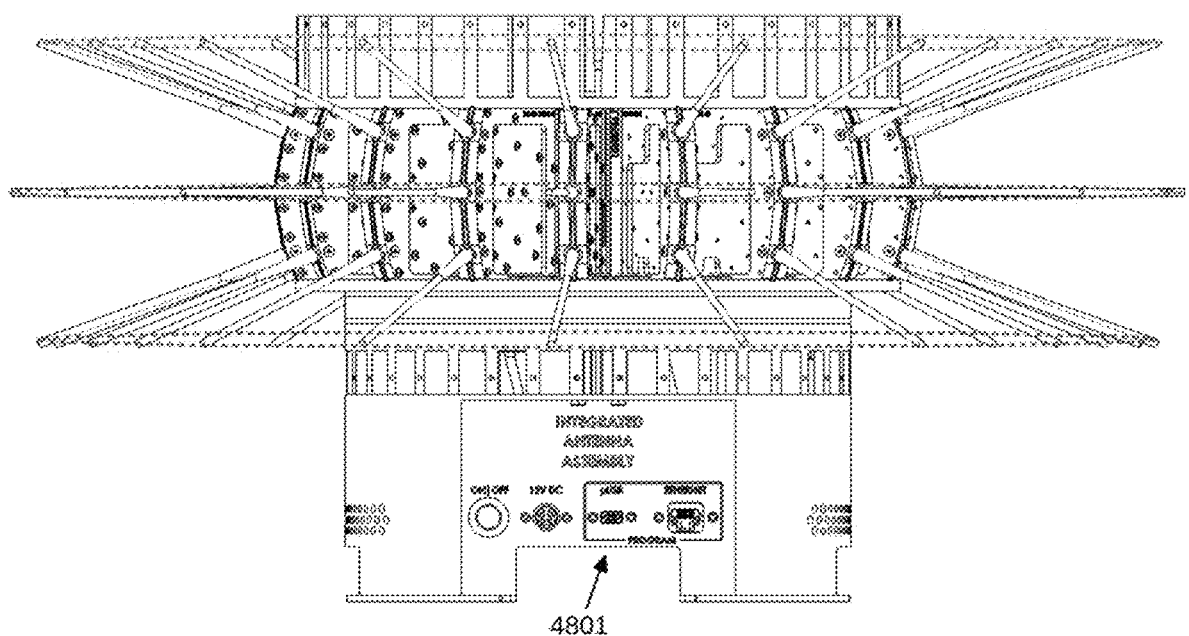

Referring now to FIG. 1A and FIG. 3B, each planar stack (4101) may comprise: a plurality of oriented antennas (4120), which may comprise N oriented antennas (4121); a plurality of transceiver blocks (4110); a plurality of 1-pole R-throw radio selectors (4130); and a plurality of stack radio feed ports (4140). N may be some second fixed positive integer, and R may be some third fixed positive integer. In the example embodiment of FIG. 3B, the number of oriented antennas (4121), N, is 3, and the oriented antennas (4121) are uniformly arranged, ranging from −20 degrees of elevation to +20 degrees of elevation. Therefore, the example embodiment the present invention shown in FIG. 3B may be described in shorthand form by the parameter set {M=18, N=3}. In some embodiments, the beamwidth of the oriented antenna (4121) may be 20 degrees, and hence in this example the solid-angular region of coverage may be within the range of minus 30 degrees to plus 30 degrees from the center oriented antenna (4121). This 60 degree coverage may be offset in elevation.

Referring now to FIG. 1A and FIG. 3A, each oriented antenna (4121) may emit and receive a narrow beam of electromagnetic radiation due solely to the physical construction of the oriented antenna (4121). The example embodiment shown in FIG. 3A demonstrates such a case, wherein each oriented antenna (4121) is a polyrod antenna, wherein the term polyrod antenna may describe an antenna that may employ a structural dielectric of high relative permittivity for the purpose of aiding in shaping the antenna's radiation pattern. In the case of the example embodiment shown in FIG. 3A, the polyrod antenna directs its radiated power (and prefers its received radiation) by about 17 decibels, or about 50 times the power, with respect to its preferred direction, when compared with a hypothetical antenna that radiates equally in all directions. An antenna's radiation pattern, or antenna pattern, may be defined by the region of solid angle about which its sensitivity decreases by about 3 decibels, or about half, with respect to that of its preferred direction (maximum). The preferred direction for the polyrod antenna that may act as the oriented antenna (4121) in the example embodiment shown in FIG. 3A, is along its longest axis, from its stem (4123) to its tip (4124). For ease of reference, the preferred direction for an antenna may be deemed its Poynting ray (4122). The beamwidth selected, for a polyrod antenna acting as an oriented antenna (4121) in any given application, may be fully discretionary, and may be independent of the angular separation between adjacent oriented antennas (4121), and may be independent of the angular separation between adjacent planar stacks (4101). The term beamwidth may refer to the breadth of the antenna pattern, in degrees. A polyrod antenna may require no DC power supply. By increasing the length of a polyrod antenna, its beam may be further narrowed, as a given application may dictate. By decreasing the length of a polyrod antenna, its beam may be further broadened, as a given application may dictate. A polyrod antenna may embed within a polymer matrix a resonant conductor coil along a portion of its length, or the polyrod antenna may be coupled into with some other form of embedded conductor. A polyrod antenna may emit one of either a left-hand circularly polarized beam, or a right-hand circularly polarized beam, or a linearly polarized beam, depending upon the nature of the embedded conductor. In some embodiments, a polyrod antenna may emit or receive different data streams in the nominally vertical (V) polarization and the nominally horizontal (H) polarization for 5G XPIC applications. A polyrod antenna may be physically scaled for its optimal transmission and reception properties once a designated range of operating frequencies, such as microwave Ka-band and other millimeter wave bands, may have been selected. Ka-band may include the high data-capacity frequency segments that may be employed in 5G networking. Microwave Ka-band may include the frequency range of 26.5 to 40 gigahertz. The antenna pattern of the two-dimensional or three-dimensional array (M-by-N) of oriented antennas (4121) may need not necessarily address its entire extent at any given time, wherein the antenna pattern of each individual oriented antenna (4121) may be bounded by a region of solid angle within which antenna gain may decrease by no more than 3 dB. In some embodiments, the two-dimensional or three-dimensional array (M-by-N) may be expressed as a spherical array in three-dimensional Euclidean space. The antenna pattern for the two-dimensional array (M-by-N) of oriented antennas (4121) may be uniformly subdivided into 54, individually, independently, addressable solid angular sub-regions for the case (M=18, N=3), but the concept may be extended to cover more or fewer sub-regions by a suitable adjustment of M and N. Since each rod produces its own individual beam, channel to channel equalization is not required. Proprietary rod antenna design enables each individual beam from each rod to be equal to the other beams from the other rods.

Referring now to FIG. 1A and FIG. 3A, each oriented antenna (4121) may comprise a stem (4123) and a tip (4124), and each oriented antenna (4121) may have a Poynting ray (4122) extending from its stem (4123) to its tip (4124) along its longest dimension. The polyrod antenna employed within the example embodiment of the present invention shown in FIG. 3A may demonstrate this very case.

Referring now to FIG. 1A, each oriented antenna (4121) may emit electromagnetic wave energy foremost about along its Poynting ray (4122), and each oriented antenna (4121) may receive electromagnetic wave energy foremost about along the negative of its Poynting ray (4122). Because an oriented antenna (4121) may emit and receive a narrow beam, even if the oriented antenna (4121) may be realized from some other type of antenna than a polyrod, it nonetheless may prefer its Poynting ray (4122). As an example, the oriented antenna (4121) may instead be realized by an array of patch antennas, whose Poynting ray (4122) may be about perpendicular to the plane of the array of patch antennas.

Referring now to FIG. 1A, every Poynting ray (4122) may lie about within a Poynting plane (4125). It may be restated in other words that the Poynting rays (4122) of all oriented antennas (4121) within a given planar stack (4101) may be about coplanar, which may define the notion of the Poynting plane (4125). The orientation of oriented antennas (4121) within a planar stack (4101) therefore may vary with only one degree of freedom, having been constrained to the Poynting plane (4125).

Referring now to FIG. 1A and FIG. 3B, each Poynting ray (4122) may be offset in its angular orientation from each adjacent Poynting ray (4122) by about a constant inter-ray angular offset (4311), in a fanned arrangement. If the antenna pattern covered by the plurality of oriented antennas (4120) within a planar stack (4101) that may employ a constant inter-ray angular offset (4311) may equal the beamwidth of the oriented antennas (4121), then the region of solid angle addressed by the plurality of oriented antennas (4120) within which the antenna pattern of each oriented antenna (4121) decreases by no more than 3 decibels may be about contiguous. Other polymorphic forms, for example, polymorphic forms having a non-uniform distribution or arrangement of antennas are also possible.

Referring now to FIG. 1A, the plurality of transceiver blocks (4110) may comprise N transceiver blocks (4111), and the operation of each transceiver block (4111) may be controlled by the digital control logic (4800). In particular, the digital control logic (4800) may be induced to configure the level of power gain applied by each amplifier that may reside within a transceiver block (4111), and may be induced to configure the direction in which power gain is applied, as may be appropriate for transmit or receive through the oriented antenna (4121). The term power gain may refer to the ratio of output power from a block to the input power to a block, and therefore may imply a direction, or sense, of operation for the block.

Referring now to FIG. 1A, each transceiver block (4111) may accept a transmit/receive mode control signal from the digital control logic (4800), and each transceiver block (4111) may employ variable levels of radio-frequency power amplification, and each transceiver may comprise a transceiver block first port (4112) and a transceiver block second port (4113). When the transceiver block (4111) may be configured for transmit, the transceiver block first port (4112) may constitute the output and the transceiver block second port (4113) may constitute the input of the transceiver block (4111). Alternatively, when the transceiver block (4111) may be configured for receive, the transceiver block second port (4113) may constitute the output and the transceiver block first port (4112) may constitute the input of the transceiver block (4111). Each transceiver block (4111) may accept signal flow direction control, specifically: up-convert (transmit) to invoke power amplification, or down-convert (receive) to invoke low-noise amplification. The signal conditioning applied may be suitable to millimeter-wave applications. Each transceiver block (4111) may include any to all of: low-noise amplification, power amplification, transmit/receive switches, and frequency-selective filtering. Controlling bias power (power supply) on/off reduces antenna power consumption thus enabling CW operation. Each transceiver block (4111) may provide individually, independently, selectable degrees of signal conditioning to each oriented antenna (4121), with respect to any radio (4401).

Referring now to FIG. 1A, each transceiver block (4111) may connect electrically via its transceiver block first port (4112) to the stem (4123) of the respective oriented antenna (4121).

Referring now to FIG. 1A and FIG. 3A, the plurality of 1-pole R-throw radio selectors (4130) may comprise N 1-pole R-throw radio selectors (4131), and each 1-pole R-throw radio selector (4131) may comprise a radio selector common port (4132) and a radio selector plurality of switch ports (4133), which may comprise R radio selector switch ports (4134). Each 1-pole, R-throw radio selector (4131) may function as if it were a 1-pole R-throw switch, in other words, that exactly one radio selector switch port (4134) may be connected electrically to the radio selector common port (4132) at any given time. Further, because the present invention may operate with high frequencies of electromagnetic wave energy such that the physical extent of the present invention may be many wavelengths at those frequencies, the 1-pole R-throw radio selector (4131) may present a matched impedance (low voltage standing-wave ratio (VSWR)) to transmission line media that may connect to its ports regardless of which radio selector switch port (4134) may be connected electrically to the radio selector common port (4132) at any given time. By way of example, the wavelength of electromagnetic radiation traveling in free space at 29.9 gigahertz may be about 1 centimeter. The example embodiment of the present invention shown in FIG. 3A, which may operate at about 29.9 gigahertz, extends about 30 centimeters from the tip of one oriented antenna (4121) to the tip of the oriented antenna (4121) opposite it, a distance that may greatly exceed one wavelength, or 1 centimeter in this example. By way of example, the wavelength of electromagnetic radiation traveling in free space at 29.9 gigahertz may be about 1 centimeter. The present invention may operate with high frequencies of electromagnetic wave energy such that the physical extent of the present invention may be many wavelengths at those frequencies.

Referring now to FIG. 1A, the operation of each 1-pole R-throw radio selector (4131) may be controlled by the digital control logic (4800). The effect of the control may be to choose which radio selector switch port (4134) may connect to the radio selector common port (4132) at any given time, individually for each 1-pole R-throw radio selector (4131).

Referring now to FIG. 1A, the function of each 1-pole R-throw radio selector (4131) may be that of a matched 1-pole R-throw switch between the radio selector plurality of switch ports (4133), and the radio selector common port (4132), and each 1-pole R-throw radio selector (4131) may connect electrically via its radio selector common port (4132) to its respective transceiver block (4111) via its transceiver block second port (4113). Each 1-pole, R-throw radio selector (4131) may function as if it were a 1-pole R-throw switch, in other words, that exactly one radio selector switch port (4134) may be connected electrically to the radio selector common port (4132) at any given time. Because the present invention may operate with high frequencies of electromagnetic wave energy such that the physical extent of the present invention may be many wavelengths at those frequencies, the 1-pole R-throw radio selector (4131) may present a matched impedance (low voltage standing-wave ratio (VSWR)) to transmission line media that may connect to its ports regardless of which radio selector switch port (4134) may be connected electrically to the radio selector common port (4132) at any given time. Every oriented antenna (4121) within the M-by-N array may access any given radio (4401) with equal agility, i.e., in the order of 10 nanoseconds. Such access may apply equally to azimuth, and to elevation. The present invention may embody potentially the fastest beam pointing technology available as of this time.

Referring now to FIG. 1A, the plurality of stack radio feed ports (4140) may comprise R stack radio feed ports (4141), and the plurality of stack radio feed ports (4140) may connect respectively, electrically, to the plurality of radio selector switch ports (4133) of every 1-pole R-throw radio selector (4131). The interface to the plurality of radios (4400) from the planar stack (4101), and hence from the oriented antennas (4121) thereby may be contained to the plurality of stack radio feed ports (4140).

Referring now to FIG. 1C and FIG. 3A, each of M Poynting planes (4125) from among the plurality of planar stacks (4100) may be offset in its angular orientation from each adjacent Poynting plane (4125) by about a constant inter-plane angular offset (4312), such that the plurality of planar stacks (4100) may form a fanned arrangement about around an array axis of symmetry (4300) lying about in the geometric plane of every of M Poynting planes (4125), wherein the constant inter-plane angular offset (4312) may measure about 360 degrees/M. When the beamwidth of the oriented antennas (4121) may be about the same as the constant inter-plane angular offset (4312) and the constant inter-ray angular offset (4311), then the present invention may receive and transmit wirelessly within a belt whose solid-angular extent is 360 degrees in azimuth, and N times the inter-ray angular offset (4311) in elevation. If the beamwidth of the oriented antennas (4121) were to decrease due to an intentional variation in their physical properties, then the same belt of solid-angular extent would remain contiguously covered by receive and transmit if the parameters M and N were increased accordingly. In some embodiments, other polymorphic forms may be possible.

Referring now to FIG. 1C, the plurality of radio feeds (4200) may comprise R radio feeds (4201), and every plurality of stack radio feed ports (4140) may connect respectively, electrically, to a plurality of radio feeds (4200). Because the present invention may operate with high frequencies of electromagnetic wave energy such that the physical extent of the present invention may be many wavelengths at those frequencies, the plurality of radio feeds (4200) may present a matched impedance (low voltage standing-wave ratio (VSWR)) to transmission line media that may connect to its ports. Therefore, every plurality of stack radio feed ports (4140) that may be associated with each planar stack (4101) may connect electrically to a matched impedance port belonging to the plurality of radio feeds (4200).

Referring now to FIG. 1A, the plurality of radios (4400) may comprise: R radios (4401); a plurality of radio feed ports (4402), which may comprise R radio feed ports (4403); and a plurality of input-output radio-frequency ports (4404), which may comprise R input-output radio-frequency ports (4405). The elements constituting the plurality of radios (4400) may all have a multiplicity of R, the number of radios (4401).

Referring now to FIG. 1A, the operation of each radio (4401) may be controlled by the digital control logic (4800), and each radio (4401) may accept an independent transmit/receive mode control signal from the digital control logic (4800). The digital control logic (4800) may be aware of transmit or receive mode of each radio (4401), and of the connections made by the 1-pole R-throw radio selectors (4131) to the pluralities of transceiver blocks (4110) within the plurality of planar stacks (4100), and accordingly may synchronize the transmit or receive mode of each transceiver block (4111) with that of its connected radio (4401).

Referring now to FIG. 1A and FIG. 4, each radio (4401) may either up-convert from a lower radio-frequency band on its input-output radio-frequency port (4405) to a higher radio-frequency band on its radio feed port (4403) for transmission, or down-convert from the higher radio-frequency band on its radio feed port (4403) to the lower radio-frequency band on its input-output radio-frequency port (4405) for reception. Each radio (4401) may expect the signal to up-converted or down-converted at its input-output radio-frequency port (4405) to reside within some lower radio-frequency band, such as may be for example S-band (2 gigahertz to 4 gigahertz). Signals in the S-band range may be commonly handled by wireless communications networking equipment today, and may be less sensitive to degradation due to signal handling than signals within some higher radio-frequency band, such that the present invention may hide some of the complexity of handling signals within some higher radio-frequency band. The higher radio-frequency band may be, for example, Ka-band (26.5 gigahertz to 40 gigahertz). The spectrum of signals passed by the 1-pole R-throw radio selectors (4131) may reside within the higher radio-frequency band. Together, the plurality of 1-pole R-throw radio selectors (4130) and the plurality of transceiver blocks (4110) may constitute an active switch matrix. The logical operation to configure the active switch matrix may reside within a lookup table within an FPGA (field-programmable gate array) within the digital control logic (4800). The higher radio-frequency band may reside at a much higher radio-frequency frequency than the lower radio-frequency band, as a result of the up/down-converter, i.e., the radio (4401), inside the multiple-input multiple-output wireless system (MIMO) (4000). The wireless (free-space electromagnetic radiation) port of the multiple-input multiple-output wireless system (MIMO) (4000) may be the oriented antenna (4121). The R radios (4401) may be independent and may simultaneously be in transmit or receive mode. The R radios (4401), and therefore the present invention, may be agnostic to any RF data that may traverse them, and therefore it. As used herein "agnostic" means "without knowledge". As a non-limiting example, the term agnostic may signify that digital data streams, which may be borne on the electromagnetic spectrum that the multiple-input multiple-output wireless system (MIMO) (4000) processes, may be unintelligible to the multiple-input multiple-output wireless system (MIMO) (4000) because it, the present invention, may be by design and as a security feature structurally incapable of understanding them. The motivation for up/down conversion may be to accommodate the use of many existing radios which may operate in the S-band and C-band ranges of electromagnetic radiation.

Referring now to FIG. 1A, each radio (4401) may connect, on a higher radio-frequency band, via a respective radio feed port (4403) to a respective radio feed (4201), which is made available to every oriented antenna (4121) by the each of the pluralities of 1-pole R-throw radio selectors (4130) within the plurality of planar stacks (4100).

Referring to FIG. 1C, the digital control logic (4800) may comprise a control port (4801), and the digital control logic (4800) may control the coordinated operation of the plurality of planar stacks (4100) and the plurality of radios (4400) to select either up-convert or down-convert individually for each radio (4401). The digital control logic (4800) may configure the plurality of 1-pole R-throw radio selectors (4130) and the plurality of transceiver blocks (4110) according to whether each oriented antenna (4121) is connected to a radio (4401) whose mode is up-convert, or down-convert.

Referring now to FIG. 1C and FIG. 4, the digital control logic (4800) may receive control commands belonging a concise command language via its control port (4801), wherein the concise command may consist of 2-byte strings or 3-byte strings, and the concise command language may connect electrically each oriented antenna (4121) with its selected radio (4401) accordingly in consideration of whether the radio (4401) is operating to up-convert, or to down-convert. In some embodiments, the concise command language may consist of strings of lengths of less than 2, 3, 4, 5, 6, 7, 8, 9, 10, 20, 50, or 100 bytes. In some embodiments, the control word may be larger than 16 bits, such as for example when: R=8, representable by 3 bits; M=18, representable by 5 bits; transmit/receive, representable by 1 bit; transmit automatic gain control (AGC), representable by 5 bits; receive automatic gain control (AGC), representable by 5 bits; power control on/off, representable by 1 bit; wherein the total of bits may be 20 bits. Because the multiple-input multiple-output wireless system (MIMO) (4000), the present invention, may have a high multiplicity of possible configurations in view of the magnitude of the parameters M, N, and R, a concise and efficient method of configuring the present invention may provide great practical benefit, and may relieve the user of the present invention of the burden of choosing among only the functionally valid of the possible configurations, for instance, the mutual consistency of transmit or receive mode among radios (4401) and transceiver blocks (4111) depending upon the configuration of the 1-pole R-throw radio selectors (4131). The concise command language may validly connect any given oriented antenna (4121) to any given radio (4401), and configure said connection for up-convert or down-convert with a multi-byte (for example a two-byte (16-bit) or a three byte (20-bit)) sequence, wherein the subsequent latency to implement the connection is in the order of 10 nanoseconds. The present invention therefore may embody potentially the fastest beam pointing technology available as of this time.

Referring now to FIG. 1A and FIG. 1C, the plurality of radios (4400) may connect respectively, electrically, to the plurality of radio feeds (4200) via the plurality of radio feed ports (4402), and the plurality of radios (4400) may connect respectively, electrically, to the plurality of input-output radio-frequency connectors (4700) via a plurality of input-output radio-frequency ports (4404).

Referring now to FIG. 1C and FIG. 3A, the multiple-input multiple-output wireless system (MIMO) (4000) may effect independent control of up-converted, radiated, electromagnetic wave power, and down-converted, incident, electromagnetic wave power sensitivity, for each oriented antenna (4121), wherein the total number of oriented antennas (4121) is M times N. When multiple radios (4101) may engage the free-space media wirelessly via the oriented antennas (4121), efficient use of the free-space media may be maximized by transmitting and receiving only within minimal regions of solid angle as may be necessary for corresponding communication stations to engage with, and transmitting only the minimum power levels necessary for corresponding communication stations to effectively receive. In the example embodiment of the present invention shown in FIG. 3A, wherein M=18 and N=3, there may be 54 independently controllable narrow beams, each of whose orientations may be fixed with respect to the orientation of the multiple-input multiple-output wireless system (MIMO) (4000), but whose transmit power and receive sensitivity may be individually controllable.

Referring now to FIG. 1C and FIG. 3A, each given oriented antenna (4121) may dominate, within its respective sub-region of solid-angular coverage, the response of all other oriented antennas (4121), and therefore the control of radiated power and received sensitivity to each sub-region may be about orthogonal. When the beamwidth of the oriented antennas (4121) may about equal the inter-ray angular offset (4311) between them within a planar stack (4101), and the beamwidth of the oriented antennas (4121) may about equal the inter-plane angular offset (4312) between planar stacks (4101), then each given oriented antenna (4121) may be more sensitive along its Poynting ray (4122) than any other oriented antenna (4122), and therefore control of the transmit power level and receive sensitivity of the transceiver block (4111) for the given oriented antenna (4121) may have about no effect upon any other oriented antenna (4121) along its respective Poynting ray (4122).

Referring now to FIG. 1C and FIG. 3A, any first given radio (4401) may be configured to address any given subset of the entirety of solid-angular sub-regions, then any second given radio (4401) may be configured to address any subset of the remaining solid-angular sub-regions not yet addressed, and in general, the pattern established for the first given radio (4401) and the second given radio (4401) may be continued such that each of the remaining radios (4401) in turn may be configured to address any subset of the remaining solid-angular sub-regions not yet addressed, until either no solid-angular sub-regions remain unaddressed, or all R radios (4401) require no further solid-angular sub-regions of address. In other words, any given oriented antenna (4121) may be exclusively connected to by some radio (4401), or any given collection of oriented antennas (4121) may be exclusively connected to by some radio (4401) due to the digital control logic (4800) responding to the concise command language; and, any given oriented antenna (4121), to all given oriented antennas (4121), may freely be ignored by all radios (4121) due to the digital control logic (4800) responding to the concise command language.

Accordingly, the multiple-input multiple-output wireless system (MIMO) (4000) may provide efficient radio coverage of the entire solid-angular region addressed wirelessly by the multiple-input multiple-output wireless system (MIMO) (4000), with respect to the location of the multiple-input multiple-output wireless system (MIMO) (4000).

Referring now to FIG. 1A and FIG. 3A, in some embodiments, the oriented antenna (4121) may be a rod type antenna having a tip (4124) and a stem (4123), from which the oriented antenna (4121) is fed by the respective transceiver block first port (4112), while in other embodiments the oriented antenna (4121) may retain only a stem (4123) from which it is fed by the respective transceiver block first port (4112). As long as the oriented antenna (4121) may form a narrow beam, it is permitted not to be required to take the form of a rod antenna. As an example, the oriented antenna (4121) may instead be realized by an array of patch antennas, whose Poynting ray (4122) may be about perpendicular to the plane of the array of patch antennas. In such a case, it retains a port from which it is fed, and this port may be considered the stem (4123) of the oriented antenna (4121).

Referring now to FIG. 4, in some embodiments, the three-dimensional (3D) multiple-input multiple-output wireless system (MIMO) (4000) may comprise a radio-frequency fanning network (4180). The radio-frequency fanning network (4180) may be some functionally equivalent generalization of pluralities of 1-pole R-throw radio selectors (4130) within the plurality of planar stacks (4100), collected into a single conceptual unit. The radio-frequency fanning network (4180) may therefore comprise a first plurality of ports R in number, and a second plurality of ports M in number, and M may represent the value M times N as a matter of notational convenience.

Referring now to FIGS. 2A, 2B, 3A, and 3B, in some embodiments: the number of planar stacks (4101), M, may be 18, the number of oriented antennas (4121) per planar stack (4101). N, may be 3; the number of radios (4401), R, may be 8, and the constant inter-ray angular offset (4311) may be about 20 degrees, and the constant inter-plane angular offset (4312) may be about 20 degrees; and the oriented antennas (4121) may be polyrod antennas. In the example embodiment of the present invention shown in FIGS. 2A, 2B, 3A, and 3B, these attributes may be observed. In FIG. 2B, the plurality of input-output radio-frequency connectors (4700) may be observed to include 8 connectors, and may imply the number of radios (4401), R, to be 8.

Referring now to FIGS. 2A, 2B, 3A, and 3B, in some embodiments, the lower radio-frequency band may reside within S-band, and the higher radio-frequency band may reside within Ka-band. The example embodiment may have been developed for fifth-generation (5G) networking infrastructure deployment, in which case the lower radio-frequency band may reside within S-band, and the higher radio-frequency band may reside within Ka-band.

Referring now to FIG. 1C and FIG. 4, in some embodiments, the digital control logic (4800) may be implemented within one or several field-programmable gate arrays (FPGA) or within one or several application-specific integrated circuits (ASIC), and some embodiments, the digital control logic (4800) may comprise a microprocessor. Since FPGAs may provide microprocessor functionality on-chip, and since FPGA's may provide nearly optimal deployment of digital logic realizations, and since ASICs may provide yet more optimal deployment of digital logic realizations, the present invention may include these features.

Referring now to FIG. 1C and FIG. 4, in some embodiments, the latency to reconfigure the multiple-input multiple-output wireless system (MIMO) (4000) via the digital control logic (4800) may be less than 10 nanoseconds. In other embodiments, the latency to reconfigure the multiple-input multiple-output wireless system (MIMO) (4000) via the digital control logic (4800) may be less than about 10, 20, 30, 40, 50, 60, 70, 80, 90, 100, 110, 120, 130, 140, 150, 160, 170, 180, 190, or 200 nanoseconds. The latency may be defined as the difference in time between when a command from the concise command language is latched into the control port (4801), and when a given 1-pole R-throw radio selector (4131) and a given transceiver block (4111) actuate the command. The present invention therefore may embody potentially the fastest beam pointing technology available as of this time.

Referring now to FIG. 1C and FIG. 4, in some embodiments, the multiple-input multiple-output wireless system (MIMO) (4000) may be embedded within a radar exciter array, a radar receiver array, a jammer, a digital radio-frequency memory jammer, a wireless network repeater system, or a 5G base station. The present invention may find application in electronic warfare contexts, or in wireless network communications network infrastructure such as 5G networking. The plurality of input-output radio-frequency ports (4404) may be connected to the signal path and consists of an external radio or exciter/receiver array.

In some embodiments, the lower radio-frequency band may reside within any of S-band, C-band, Ka-band, Ku-band, E-band, V-band, X-band, L-band or W-band, and in some embodiments, the higher radio-frequency band may reside within any of S-band, C-band, Ka-band, Ku-band, E-band, V-band, X-band, L-band or W-band. S-band may include electromagnetic radiation in frequencies in the range from 1.550 gigahertz to 3.990 gigahertz. C-band may include electromagnetic radiation in frequencies in the range from 3.900 gigahertz to 6.200 gigahertz. Ka-band may include electromagnetic radiation in frequencies in the range from 20.000 gigahertz to 36.000 gigahertz. Ku-band may include electromagnetic radiation in frequencies in the range from 10.900 gigahertz to 20.000 gigahertz. E-band may include electromagnetic radiation in frequencies in the range from 2.000 gigahertz to 3.000 gigahertz. V-band may include electromagnetic radiation in frequencies in the range from 46.000 gigahertz to 56.000 gigahertz. X-band may include electromagnetic radiation in frequencies in the range from 6.200 gigahertz to 10.900 gigahertz. L-band may include electromagnetic radiation in frequencies in the range from 40.000 gigahertz to 60.000 gigahertz. W-band may include electromagnetic radiation in frequencies in the range from 56.000 gigahertz to 100.000 gigahertz.

In some embodiments, the beam of electromagnetic radiation emitted by each oriented antenna (4121) may be either circularly polarized or linearly polarized.

In some embodiments, the concise command language may comprise commands consisting of a 2-bytes (16-bits) or a 3-bytes (20-bits) command string.

In some embodiments, the processing performed by the multiple-input multiple-output wireless system (MIMO) (4000) may be agnostic to any RF data that may traverse it. The term agnostic may signify, within this document, that digital data streams, which may be borne on the electromagnetic spectrum that the multiple-input multiple-output wireless system (MIMO) (4000) processes, may be unintelligible to the multiple-input multiple-output wireless system (MIMO) (4000) because it, the present invention, may be by design and as a security feature structurally incapable of understanding them.

In some embodiments, the transceiver block (4111) may comprise any of: a low-noise amplifier; a power amplifier, transmit/receive switch; and/or frequency-selective filtering and TX and RX AGCs. The low-noise amplifier may be employed to improve performance of the present invention when the transceiver block (4111) may operate in conjunction with its respective radio (4401) in down-convert (receive) mode. The power amplifier may be employed to improve performance of the present invention when the transceiver (4111) may operate in conjunction with its respective radio (4401) in up-convert (transmit) mode. The frequency-selective filtering may reduce out-of-band radiated power by the power amplifier when the transceiver block (4111) may operate in transmit mode, and the frequency-selective filtering may maintain the dynamic range of the low-noise amplifier when the transceiver block (4111) may operate in receive mode. Out-of-band radiated power may be defined as radiated power outside the band of frequencies of electromagnetic radiation licensed to the operator of the present invention. Dynamic range may be defined as the ratio of signal power to the aggregate of noise power plus spurious power. The transceiver block (4111) will have automatic gain control (AGC) in both directions, not so dynamic, which may be used to equalize the signal level for each transceiver or radio-frequency (RF) path. The AGC commands are not permitted to switch at the beam pointing rate. The automatic gain control (AGC) may be used for signal-to-noise ratio (SNR) optimization dynamic range control and chain gain equalization. Power consumption minimization is critical, so each Power Amplifier in the transceiver is turned off when not in use or in receive mode, conversely the bias power is turned off in the transceiver's receive chain when not in use or in transmit mode. (See FIG. 4 power control.)

Referring now to FIGS. 2A and 2B, in some embodiments, the multiple-input multiple-output wireless system (MIMO) (4000) may be internally cable-less and in some embodiments, each oriented antenna (4121) may be a polyrod antenna. In the example embodiment shown in FIGS. 2A and 28, the assembly may be seen to include no cabling, which may reduce the overall cost to produce the present invention, and may increase its reliability. Further, each of the oriented antennas (4121) in the example embodiment may be a polyrod antenna whose Poynting ray (4122) lies along its longest dimension from its stem (4123) to its tip (4124).

In some embodiments, every oriented antenna (4121) may transmit or receive within any of S-band, C-band, Ka-band, Ku-band, E-band, V-band, X-band, L-band or W-band.

In some embodiments, each given oriented antenna (4121) may dominate, within its respective sub-region of solid-angular coverage, the response of all other oriented antennas (4121). When the beamwidth of the oriented antennas (4121) may about equal the inter-ray angular offset (4311) between them within a planar stack (4101), and the beamwidth of the oriented antennas (4121) may about equal the inter-plane angular offset (4312) between planar stacks (4101), then each given oriented antenna (4121) may be more sensitive along its Poynting ray (4122) than any other oriented antenna (4122), and therefore control of the transmit power level and receive sensitivity of the transceiver block (4111) for the given oriented antenna (4121) may have about no effect upon any other oriented antenna (4121) along its respective Poynting ray (4122).

EXAMPLE

The following is a non-limiting example of the present invention. It is to be understood that said example is not intended to limit the present invention in any way. Equivalents or substitutes are within the scope of the present invention.

Referring now to the example embodiment of the present invention shown in FIGS. 2A and 2B, and to FIGS. 3A and 38, the three-dimensional (3D), 380 degree, omnidirectional multiple-input multiple-output wireless system (MIMO) (4000) may be a software-defined radio system, which may be made up of, a plurality of planar stacks (4100), which may comprise M=18 planar stacks (4101), wherein each planar stack (4101) may comprise N=3 oriented antennas (4121); a plurality of radios (4400), which may comprise R=8 radios (4401); and a digital control logic (4800), which may comprise a control port (4801). The lower radio-frequency band may reside within S-band, and the higher radio-frequency band may reside within Ka-band, as may be convenient for building out 5G wireless network infrastructure. The example embodiment may be used both as a radio and radar by being able to update via software the right algorithms for those specific applications. The dynamic range of the example embodiment may allow for lower than −90 decibels, relative to 1 milliwatt, of sensitivity at 5G frequencies that may make it first in the market and may allow for substantial range from its base. The example embodiment may do this by utilizing up to 8 channels of transmit and receive radio frequency paths. The example embodiment may be made up of 8 discrete transmit and receive converters that may up-convert to 5G frequencies or any other frequency with beyond 1 GHz bandwidth capability. The example embodiment may utilize local oscillators that may provide −135 decibels, relative to carrier, per hertz phase noise at 10 kilohertz from carrier that may provide substantial benefit to the 5G movement. The 8 different radios (4401) may be routed to 54 different organic-base oriented antennas (4121) that may provide 20 degrees beam width with 17 decibels, relative to an isotropic radiator, of gain at 28 GHz. The example embodiment may generate up to more than 40 W of radiated power per multiple-input multiple-output wireless system (MIMO) (4000). There may be more than 432 radio frequency traces embedded into an organic printed circuit board that may operate at 28 gigahertz. By doing this, the example embodiment may have substantially reduced the cost of the hardware by eliminating all of the cables and their associated connectors. Existing software defined radios do not have the built-in flexibility of cost and capability. 5G radios have a difficult time going through buildings and glass. Similar radios at these frequencies do not have the dynamic range, power, modular cost approach, phase noise, multi use (radio, radar, jammer) and/or frequency and bandwidth agility. Fundamentally, the example embodiment may be a low cost, high volume manufacturable item for 5G applications. The example embodiment may be use as a repeater at any frequency and a signal booster at any range.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A three-dimensional (3D), 360 degree, omnidirectional multiple-input multiple-output wireless system (MIMO) comprising: A) a plurality of planar stacks comprising M planar stacks; wherein M is some first fixed positive integer; wherein each planar stack comprises:

a plurality of oriented antennas comprising N oriented antennas; wherein N is some second fixed positive integer; wherein each oriented antenna has a Poynting ray extending from its stem to its tip along its longest dimension; wherein every Poynting ray lies about within a Poynting plane; wherein each oriented antenna is configured to emit and receive a narrow beam of electromagnetic radiation due solely to the physical construction of the oriented antenna; wherein each oriented antenna is configured to emit electromagnetic wave energy foremost about along its Poynting ray; wherein each oriented antenna receives electromagnetic wave energy foremost about along the negative of its Poynting ray; wherein each Poynting ray is offset in its angular orientation from each adjacent Poynting ray by about a constant inter-ray angular offset, in a fanned arrangement;

a plurality of transceiver blocks comprising N transceiver blocks; wherein each transceiver block connects electrically to the stem of the respective oriented antenna via a transceiver block first port of said transceiver block; wherein the operation of each transceiver block is controlled by a digital control logic; wherein each transceiver block employs variable levels of radio-frequency power amplification; wherein each transceiver block is configured to accept a transmit/receive mode control signal from the digital control logic;

a plurality of 1-pole R-throw radio selectors comprising N 1-pole R-throw radio selectors; wherein R is some third fixed positive integer; wherein each transceiver block connects electrically to a radio selector common port of the respective 1-pole R-throw radio selector via a transceiver block second port; wherein the function of each given 1-pole R-throw radio selector is that of a matched 1-pole R-throw switch between the radio selector plurality of switch ports of the given 1-pole R-throw radio selector, and the radio selector common port of the given 1-pole R-throw radio selector; wherein the radio selector plurality of switch ports comprises R radio selector switch ports; wherein the operation of each 1-pole R-throw radio selector is controlled by the digital control logic; and a plurality of stack radio feed ports comprising R stack radio feed ports; wherein the plurality of stack radio feed ports connects respectively, electrically, to the plurality of radio selector switch ports of every 1-pole R-throw radio selector; wherein every plurality of stack radio feed ports connects respectively, electrically, to a plurality of radio feeds, comprising R radio feeds; and wherein each of M Poynting planes from among the plurality of planar stacks is offset in its angular orientation from each adjacent Poynting plane by about a constant inter-plane angular offset, such that the plurality of planar stacks forms a fanned arrangement about around an array axis of symmetry lying about in the geometric plane of every Poynting plane; wherein the constant inter-plane angular offset measures about 360 degrees/M;

a plurality of radios, comprising R radios; wherein the plurality of radios connects respectively, electrically, to the plurality of radio feeds via a plurality of radio feed ports, comprising R radio feed ports; wherein the plurality of radios connects respectively, electrically, to the plurality of input-output radio-frequency connectors via a plurality of input-output radio-frequency ports, comprising R input-output radio-frequency ports; wherein the operation of each radio is controlled by the digital control logic; wherein each radio is configured to accept an independent transmit/receive mode control signal from the digital control logic; wherein each radio is configured to either up-convert from a lower radio-frequency band on its input-output radio-frequency port to a higher radio-frequency band on its radio feed port for transmission, or down-convert from the higher radio-frequency band on its radio feed port to the lower radio-frequency band on its input-output radio-frequency port for reception; and the digital control logic, wherein the digital control logic is configured to control the coordinated operation of the plurality of planar stacks and the plurality of radios to select either up-convert or down-convert individually for each radio, and to configure the plurality of 1-pole R-throw radio selectors and the plurality of transceiver blocks to the plurality of oriented antennas according to whether each oriented antenna is connected to a radio whose mode is up-convert, or down-convert; wherein the digital control logic receives control commands belonging a concise command language via its control port; wherein the concise command consists of multi-byte strings; wherein the concise command language is able to connect electrically each oriented antenna with its selected radio accordingly in consideration of whether the radio is operating to up-convert, or to down-convert;

wherein the multiple-input multiple-output wireless system (MIMO) is configured to effect independent control of up-converted, radiated, electromagnetic wave power, and down-converted, incident, electromagnetic wave power sensitivity, for each oriented antenna, wherein the total number of oriented antennas is M times N; wherein each given oriented antenna dominates, within its respective sub-region of solid-angular coverage, the response of all other oriented antennas; wherein the control of radiated power and received sensitivity to each sub-region therefore is about orthogonal; wherein any first given radio, from among the plurality of radios, is configured to address any given subset of the entirety of solid-angular sub-regions, wherein then any second given radio is configured to address any subset of the remaining solid-angular sub-regions not yet addressed, wherein the pattern established for the first given radio and the second given radio is continued such that each of the remaining radios in turn is configured to address any subset of the remaining solid-angular sub-regions not yet addressed, until either no solid-angular sub-regions remain unaddressed, or all R radios require no further solid-angular sub-regions of address; so as to provide efficient radio coverage of the entire solid-angular region addressed wirelessly by the multiple-input multiple-output wireless system (MIMO), with respect to the location of the multiple-input multiple-output wireless system (MIMO).

2. The multiple-input multiple-output wireless system (MIMO) of claim 1, wherein the number of planar stacks, M, is 18; wherein the number of oriented antennas per planar stack, N, is 3; wherein the number of radios, R, is 8; wherein the constant inter-ray angular offset is about 20 degrees; wherein the constant inter-plane angular offset is about 20 degrees; wherein the oriented antennas are polyrod antennas; and wherein the lower radio-frequency band resides within S-band; wherein the higher radio-frequency band resides within Ka-band.

3. The multiple-input multiple-output wireless system (MIMO) of claim 1, wherein the digital control logic is implemented within a field-programmable gate array or within an application-specific integrated circuit; wherein the digital control logic comprises a microprocessor; and wherein the latency to reconfigure the multiple-input multiple-output wireless system (MIMO) via the digital control logic is less than about 10 nanoseconds.

4. The multiple-input multiple-output wireless system (MIMO) of claim 1, wherein the multiple-input multiple-output wireless system (MIMO) is embedded within a radar exciter array, a radar receiver array, a digital radio-frequency memory jammer, a wireless network repeater system, a 5G base station, or a point-to-point data link.

5. A three-dimensional (3D) multiple-input multiple-output wireless system (MIMO) comprising:

a plurality of planar stacks comprising M planar stacks; wherein M is some first fixed positive integer; wherein each planar stack comprises:

a plurality of oriented antennas comprising N oriented antennas; wherein N is some second fixed positive integer; wherein each oriented antenna has a Poynting ray; wherein each oriented antenna has a stem; wherein every Poynting ray lies about within a Poynting plane; wherein each oriented antenna emits electromagnetic wave energy foremost about along its Poynting ray; wherein each oriented antenna receives electromagnetic wave energy foremost about along the negative of its Poynting ray; wherein each Poynting ray is offset in its angular orientation from each adjacent Poynting ray by an inter-ray angular offset, in a fanned arrangement, or in another polymorphic arrangement;

a plurality of transceiver blocks comprising N transceiver blocks; wherein each transceiver block has a transceiver block first port and a transceiver block second port; wherein each transceiver block connects electrically via its transceiver block first port to the stem of the respective oriented antenna; wherein the operation of each transceiver block is controlled by a digital control logic; wherein each transceiver block employs a variable level of radio-frequency amplification;

a plurality of 1-pole R-throw radio selectors comprising N 1-pole R-throw radio selectors; wherein R is some third fixed positive integer; wherein each transceiver block connects electrically via its transceiver block second port to a radio selector common port of the respective 1-pole R-throw radio selector; wherein the radio selector plurality of switch ports comprises R radio selector switch ports; wherein the operation of each 1-pole R-throw radio selector is controlled by the digital control logic;

a plurality of stack radio feed ports comprising R stack radio feed ports; wherein the plurality of stack radio feed ports connects respectively, electrically, to the radio selector plurality of switch ports of every 1-pole R-throw radio selector; wherein every plurality of stack radio feed ports connects respectively, electrically, to a plurality of radio feeds, comprising R radio feeds; wherein each of M Poynting planes is offset in its angular orientation from each adjacent Poynting plane by an inter-plane angular offset, such that the plurality of planar stacks forms a fanned arrangement about around an array axis of symmetry lying about in the geometric plane of every Poynting plane;

a plurality of radios, comprising R radios; wherein the plurality of radios connects respectively, electrically, via a plurality of radio feed ports to the plurality of radio feeds; wherein the plurality of radio feed ports comprises R radio feed ports; wherein the plurality of radios connects respectively, electrically, via a plurality of input-output radio-frequency ports to the plurality of input-output radio-frequency connectors; wherein the plurality of input-output radio-frequency ports comprises R input-output radio-frequency ports; wherein the operation of each radio is controlled by the digital control logic; wherein each radio either up-converts from a lower radio-frequency band on its input-output radio-frequency port to a higher radio-frequency band on its radio feed port for transmission, or down-converts from the higher radio-frequency band on its radio feed port to the lower radio-frequency band on its input-output radio-frequency port for reception;

the digital control logic, wherein the digital control logic controls the coordinated operation of the plurality of planar stacks and the plurality of radios to select either up-convert or down-convert individually for each radio, and to configure the plurality of 1-pole R-throw radio selectors and the plurality of transceiver blocks to the plurality of oriented antennas according to whether each oriented antenna is connected to a radio whose mode is up-convert, or down-convert; wherein the digital control logic receives control commands via its control port; wherein the multiple-input multiple-output wireless system (MIMO) is configured to effect independent control of up-converted, radiated, electromagnetic wave power, and down-converted, incident, electromagnetic wave power sensitivity, for each oriented antenna, wherein the total number of oriented antennas is M times N; wherein each given oriented antenna dominates, within its respective sub-region of solid-angular coverage, the response of all other oriented antennas; wherein the control of radiated power and received sensitivity to each sub-region therefore is about orthogonal; wherein any first given radio, from among the plurality of radios, is configured to address any given subset of the entirety of solid-angular sub-regions, wherein then any second given radio is configured to address any subset of the remaining solid-angular sub-regions not yet addressed, wherein the pattern established for the first given radio and the second given radio is continued such that each of the remaining radios in turn is configured to address any subset of the remaining solid-angular sub-regions not yet addressed, until either no solid-angular sub-regions remain unaddressed, or all R radios require no further solid-angular sub-regions of address; so as to provide efficient radio coverage of the entire solid-angular region addressed wirelessly by the multiple-input multiple-output wireless system (MIMO), with respect to the location of the multiple-input multiple-output wireless system (MIMO).

6. The multiple-input multiple-output wireless system (MIMO) of claim 5, wherein the lower radio-frequency band resides within any of S-band, C-band, Ka-band, Ku-band, E-band, V-band, X-band, L-band or W-band; and wherein the higher radio-frequency band resides within any of S-band, C-band, Ka-band, Ku-band, E-band, V-band, X-band, L-band or W-band.

7. The multiple-input multiple-output wireless system (MIMO) of claim 5, wherein the beam of electromagnetic radiation emitted by each oriented antenna is either circularly polarized or linearly polarized.

8. The multiple-input multiple-output wireless system (MIMO) of claim 5, wherein the digital control logic is implemented within a field-programmable gate array or within an application-specific integrated circuit; wherein the digital control logic comprises a microprocessor; wherein the latency to reconfigure the multiple-input multiple-output wireless system (MIMO) via the digital control logic is less than about 10 nanoseconds.

9. The multiple-input multiple-output wireless system (MIMO) of claim 5, wherein the concise command language comprises commands consisting of multi-byte command strings.

10. The multiple-input multiple-output wireless system (MIMO) of claim 5, wherein the processing performed by the multiple-input multiple-output wireless system (MIMO) is agnostic to any RF data that may traverse it.

11. The multiple-input multiple-output wireless system (MIMO) of claim 5, wherein the multiple-input multiple-output wireless system (MIMO) is embedded within a radar exciter array, a radar receiver array, a jammer, a digital radio-frequency memory, or a wireless network repeater system.

12. The multiple-input multiple-output wireless system (MIMO) of claim 5, wherein the transceiver block comprises any of: a low-noise amplifier; a power amplifier, transmit/receive switch; or frequency-selective filtering.

13. The multiple-input multiple-output wireless system (MIMO) of claim 5, wherein the multiple-input multiple-output wireless system (MIMO) is internally cable-less.

14. The multiple-input multiple-output wireless system (MIMO) of claim 5, wherein each oriented antenna is a polyrod antenna.

15. A three-dimensional (3D), 360 degree, omnidirectional multiple-input multiple-output wireless system (MIMO) comprising:
- a plurality of planar stacks comprising M planar stacks, wherein M is some first fixed positive integer, wherein each planar stack comprises:
- a plurality of oriented antennas comprising:
- N oriented antennas, wherein N is some second fixed positive integer, wherein each oriented antenna comprises a stem; tip; and a Poynting ray; wherein each oriented antenna emits and receives a narrow beam of electromagnetic radiation due solely to the physical construction of the oriented antenna; wherein the Poynting ray extends from the stem to the tip along the longest dimension of the oriented antenna; wherein the oriented antenna emits electromagnetic wave energy foremost about along its Poynting ray, and each oriented antenna receives electromagnetic wave energy foremost about along the negative of its Poynting ray; and
- a Poynting plane; wherein every Poynting ray lies about within the Poynting plane; and wherein each Poynting ray is offset in its angular orientation from each adjacent Poynting ray by about a constant inter-ray angular offset, in a fanned arrangement;
- a plurality of transceiver blocks comprising N transceiver blocks, wherein each transceiver block comprises: transceiver block first port; and b a transceiver block second port; wherein the radio-frequency power amplification level applied by the transceiver block is variable and configurable; wherein the transceiver block is configured to apply radio-frequency power amplification between the transceiver block first port and the transceiver block second port; wherein the transmit/receive sense of the radio-frequency power amplification is either from the transceiver block second port to the transceiver block first port, or from the transceiver block first port to the transceiver block second port; wherein the transmit/receive sense of the radio-frequency power amplification is configurable;
- a plurality of 1-pole R-throw radio selectors comprising N 1-pole R-throw radio selectors, wherein R is some third fixed positive integer, wherein each 1-pole R-throw radio selector comprises: a radio selector common port; and a radio selector plurality of switch ports comprising R radio selector switch ports; wherein the function of each 1-pole R-throw radio selector is that of a matched 1-pole R-throw switch between the radio selector plurality of switch ports, and the radio selector common port; wherein the connection between a given radio selector switch port and the radio selector common port for each 1-pole R-throw radio selector is configurable; and
- and a plurality of stack radio feed ports comprising R stack radio feed ports; wherein the plurality of stack radio feed ports connects respectively, electrically, to the plurality of radio selector switch ports of every 1-pole R-throw radio selector; wherein each transceiver block connects electrically via its transceiver block first port to the stem of the respective oriented antenna; wherein each 1-pole R-throw radio selector connects electrically via its radio selector common port to the respective transceiver block via its transceiver block second port; wherein each of M Poynting planes from among the plurality of planar stacks is offset in its angular orientation from each adjacent Poynting plane by about a constant inter-plane angular offset, such that the plurality of planar stacks forms a fanned arrangement about around an array axis of symmetry lying about in the geometric plane of every Poynting plane, wherein the constant inter-plane angular offset measures about 360 degrees/M;
- a plurality of radio feeds comprising R radio feeds;
- a plurality of radios comprising: 1) R radios; 2) a plurality of radio feed ports comprising R radio feed ports; and 3) a plurality of input-output radio-frequency ports comprising R input-output radio-frequency ports; wherein the transmit/receive sense of each radio individually is configurable for either up-convertor down-convert;
- wherein each radio either up-converts from a lower radio-frequency band on its input-output radio-frequency port to a higher radio-frequency band on its radio feed port for transmission, or down-converts from the higher radio-frequency band on its radio feed port to the lower radio-frequency band on its input-output radio-frequency port for reception;
- a plurality of input-output radio-frequency connectors comprising R input-output radio-frequency connectors; and
- a digital control logic comprising a control port; wherein the transmit/receive sense of every transceiver block is configured by the digital control logic; wherein the radio-frequency power amplification level of every transceiver block is configured by the digital control logic; wherein the connection between a given radio selector switch port and the respective radio selector common port for each 1-pole R-throw radio selector is configured by the digital control logic; wherein the transmit/receive sense of each radio is configured by the digital control logic; wherein the digital control logic is configured to control the coordinated operation of the plurality of planar stacks and the plurality of radios to select either up-convertor down-convert individually for each radio; wherein the digital control logic is configured to configure the plurality of 1-pole R-throw radio selectors and the plurality of transceiver blocks consistent with whether each oriented antenna is connected to a radio whose mode is configured as up-convert, or as down-convert; wherein the digital control logic is configured by control commands that the digital control logic receives via its control port; wherein the control commands belong to a concise command language that consists of multi-byte strings; wherein every plurality of stack radio feed ports belonging to each of M planar stacks connects respectively, electrically, to the plurality of radio feeds; wherein the plurality of radios connects respectively, electrically, via the plurality of radio feed ports to the plurality of radio feeds; wherein the plurality of radios connects respectively, electrically, via the plurality of input-output radio-frequency ports to the plurality of input-output radio-frequency connectors; wherein the MIMO is configured by the digital control logic to effect independent control of up-converted, radiated, electromagnetic wave power, and down-converted, incident, electromagnetic wave power sensitivity, for each oriented antenna; wherein each given oriented antenna dominates, within its respective sub-region of solid-angular address, the response of all other oriented antennas, and therefore the control of radiated power and received sensitivity by the digital control logic to each sub-region is about orthogonal; wherein any first given radio accordingly is configured by the digital control logic to address any given subset of the entirety of solid-angular sub-regions, and then any second given radio is configured to address any subset of the remaining solid-angular sub-regions not yet addressed; wherein the pattern established for the first given radio and the second given radio is continued such that each of the remaining radios in turn is configured to address any subset of the remaining solid-angular sub-regions not yet addressed, until either no solid-angular sub-regions remain unaddressed, or all R radios require no further solid-angular sub-regions of address; wherein accordingly, the MIMO provides efficient radio coverage of the entire solid-angular region addressed by the MIMO, with respect to the location of the MIMO.

* * * * *